US006357756B1

(12) United States Patent
Matovich

(10) Patent No.: US 6,357,756 B1
(45) Date of Patent: Mar. 19, 2002

(54) BALANCE SHAFT SEAL CLAMP

(75) Inventor: Paul T. Matovich, Aurora, IL (US)

(73) Assignee: Chicago Seal Clamp, Aurora, IL (US)

(*) Notice: Subject to any disclaimer, the term of this patent is extended or adjusted under 35 U.S.C. 154(b) by 0 days.

(21) Appl. No.: 09/434,892

(22) Filed: Nov. 5, 1999

(51) Int. Cl.[7] .......................... F16J 15/54; F16F 15/10
(52) U.S. Cl. .................................. 277/520; 123/192.2
(58) Field of Search .............................. 277/511, 520; 123/192.2, 198 E

(56) References Cited

U.S. PATENT DOCUMENTS 4,905,299 A * 2/1990 Ferraiuolo et al.
5,456,160 A * 10/1995 Caldwell
5,839,406 A * 11/1998 Hall
5,983,852 A * 11/1999 Weitz et al.
6,120,006 A * 9/2000 Yamaki et al.
6,217,028 B1 * 4/2001 Wilke

* cited by examiner

*Primary Examiner*—Anthony Knight
*Assistant Examiner*—John L. Beres
(74) *Attorney, Agent, or Firm*—McDonnell Boehnen Hulbert & Berghoff

(57) ABSTRACT

A balance shaft seal retainer for retaining the front balance shaft seal of an engine oil pump. At least one bolt threaded within one or more apertures of the retainer and into the engine secures the seal retainer on the oil pump housing. The semi-circular cutout at the bottom edge of the retainer effectively holds a semi-circular region of the annular seal in place and permits installation without the need to remove the balance shaft or timing or balance belt.

3 Claims, 2 Drawing Sheets

BALANCE SHAFT SEAL CLAMP

FIELD OF INVENTION

The claimed invention relates to a balance shaft seal clamp that holds the front balance shaft seal in place on the oil pump housing of a timing belt assembly in an automobile.

BACKGROUND OF THE INVENTION

Numerous types of clamps and retainers have been developed over the years for holding bearings, oil seals, and other devices in engines. Typically, one skilled in the art designs retainers and clamps to satisfy a specific objective or requirement. As a result, the clamps and retainers in the prior art consist of a variety of designs. Indeed, some known prior art includes a bearing retaining plate (U.S. Pat. No. 4,128,283), a wear sleeve oil seal (U.S. Pat. No. 4,337,954), a removable retaining plate (U.S. Pat. No. 4,768,973), a hold down bearing retainer (U.S. Pat. No. 4,905,299), a retention plate assembly for retaining a lock (U.S. Pat No. 4,930,822), and a recoil spring end retainer (U.S. Pat. No. 5,067,451).

In addition to the clamps and retainers referenced above, the prior art also discloses a balance shaft retainer (U.S. Pat. No. 5,839,406). A balance shaft seal is a planar annular seal mounted about the balance shaft of an engine. When mounted, the balance shaft seal sits in an annular indentation on the oil pump housing. The purpose of a balance shaft seal is to prevent oil from leaking out of the oil pump housing. As oil pressure pushes against the balance shaft seal, the pressure may displace the balance shaft seal from its annular seat. Consequently, oil may leak out of the engine. A balance shaft seal retainer is designed to hold the balance shaft seal in place. U.S. Pat. No. 5,839,406 discloses a generally square planar balance shaft seal retainer with a front smooth face, rear smooth face, and a square cut on the bottom edge. The seal retainer mounts on the oil pump housing via bolts and planar ring shaped spacers. As oil pressure continuously pushes against the balance shaft seal, the square cut on the bottom edge is intended to encompasses and hold the balance shaft seal in place.

While the balance shaft seal retainer in the prior art does generally prevent the front balance shaft seal from being pushed out of place, the bottom edge holding the balance shaft seal may deform over time. Oil pressure from within the oil pump housing may bend the balance shaft seal retainer, thereby pushing the balance shaft seal out of place and resulting in oil loss and engine failure. Installation of the prior art seal retainer is also difficult. A balance shaft seal retainer is mounted on the oil pump housing by threading one or more bolts through one or more apertures in the balance shaft seal retainer and into threaded bores in an oil pump housing. Since the prior art seal retainer is planar and must be mounted on a non-planar surface of the oil pump housing, spacers are required to support the prior art seal retainer from the recesses of the engine. Furthermore, the prior art model seal retainer obstructs a mechanic's view of the upper timing mark on the oil pump housing during and after installation. Accordingly, the prior art seal retainer may impair certain types of engine repair. In these respects, the prior art balance shaft seal retainer is difficult to use and does not effectively hold the balance shaft seal in place.

SUMMARY OF THE INVENTION

In accordance with preferred embodiments of the present invention, some of the problems associated with the prior art seal retainers are overcome. The subject invention defines the details of an improved balance shaft seal clamp. One object of the invention is to provide a one piece balance shaft seal retainer for securing the front balance shaft seal in the oil pump housing such that oil pressure does not push the balance shaft seal out of place.

It is another object of the present invention to provide a one piece balance shaft seal retainer that, when installed, semi-circularly encompasses the annular balance shaft seal and does not torsionally deform over time.

It is still another object of the present invention to provide a one piece balance shaft seal retainer that can be installed without removing the timing or balance belt.

Still another object of the present invention to provide a one piece balance shaft seal retainer with a ridged profile that permits the balance shaft seal retainer to be fitted within the recess of the oil pump housing without the need for spacers.

It is still another object of the present invention to provide a one piece balance shaft seal retainer with one or more apertures to permit timing belt marks to be visible both during and after installation of the balance shaft seal retainer.

The balance shaft seal retainer described herein accomplishes these objectives with a configuration that is generally rectangular with a semi-circular bottom edge cutout. The novelty of the present invention, in part, relies on semi-circular bottom edge. The semi-circular bottom edge effectively holds the annular balance shaft seal in place. Unlike the prior art, the bottom edge is less prone to deformation and does not obstruct the view of the timing marks on the oil pump housing.

The profile of balance shaft seal retainer is also novel. The profile of the present invention is generally non-planar, comprising a ridged front face and complementary rear indented face. The profile is configured to contour around an annular indentation on the oil pump housing where the balance shaft seal sits about the balance shaft. When mounted, the retainer is flush against the oil pump housing and the semi-circular bottom edge is flush against the balance shaft seal. As such, spacers are not needed to hold the balance shaft seal in place.

BRIEF DESCRIPTION OF THE DRAWINGS

The foregoing and other objects, features and advantages of the present invention will be more readily appreciated upon reference to the following disclosure when considered in conjunction with the accompanying drawings, in which.

DETAILED DESCRIPTION OF THE PREFERRED EMBODIMENT

Figure 1:
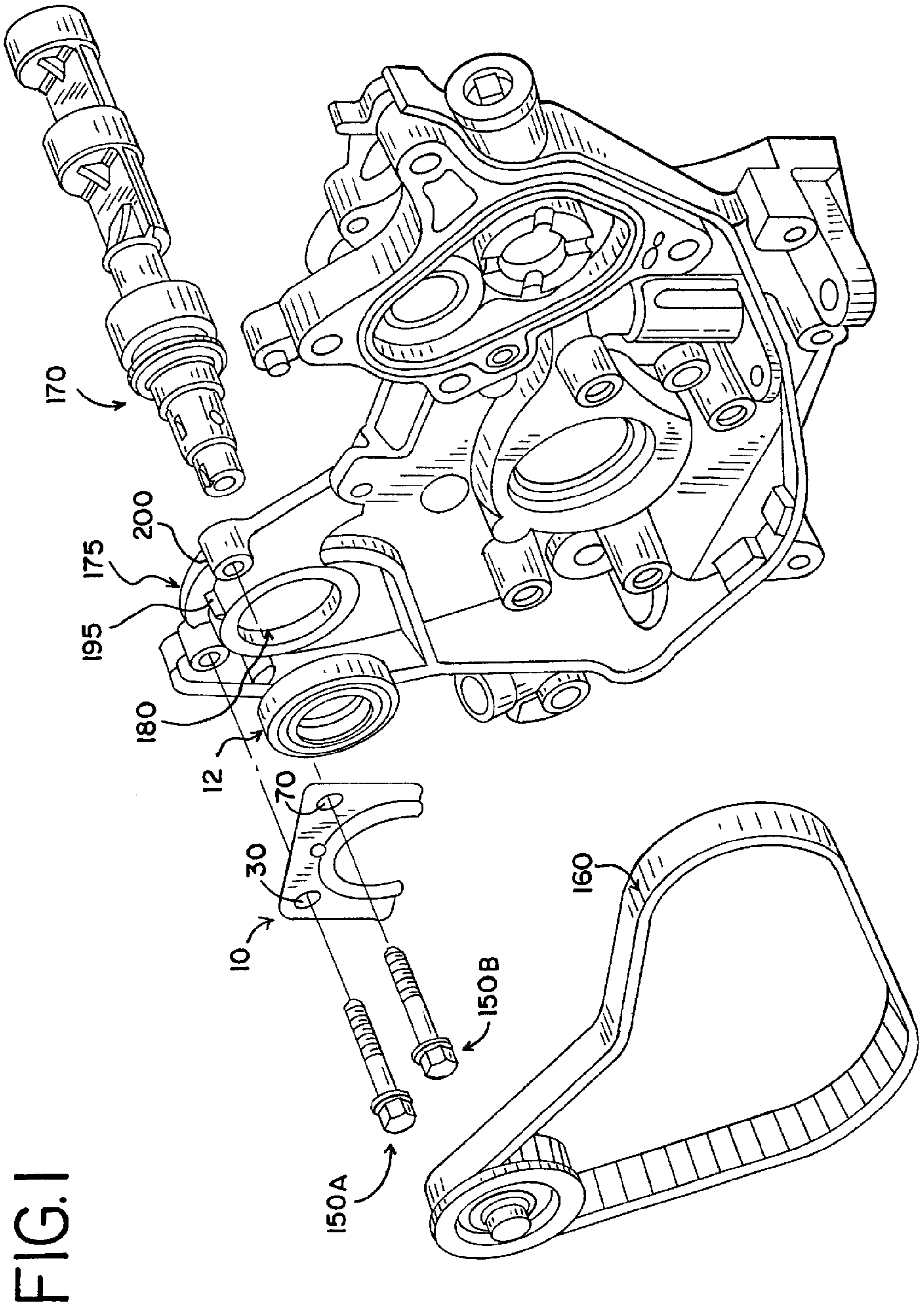
FIG. 1 is a perspective view of the preferred embodiment of a balance shaft seal retainer according to the present invention in use.

The preferred embodiment of the claimed invention is a balance shaft seal retainer 10. A balance shaft seal prevents oil from leaking out of an engine. A balance shaft seal retainer is a device that prevents oil pressure from pushing the balance shaft seal 12 out of its annular seat on the oil pump housing 175. FIG. 1 describes the placement of a balance shaft seal retainer. A balance shaft seal retainer 10 preferably fits around the balance shaft 170 and mounts flush against the balance shaft seal 12 of 4 cylinder engines in the 1990 to 2000 model year HONDA ACCORDs, 1992 to 2000 model year HONDA PRELUDEs, 1997 to 2000 model year HONDA ACURA CLs, and 1995 to 1998 model year HONDA ODYSSEYs. Two bolts 150A, 150B threaded through two apertures 30 & 70 into the engine oil pump housing 175 hold the preferred seal clamp in place.

Figure 2:
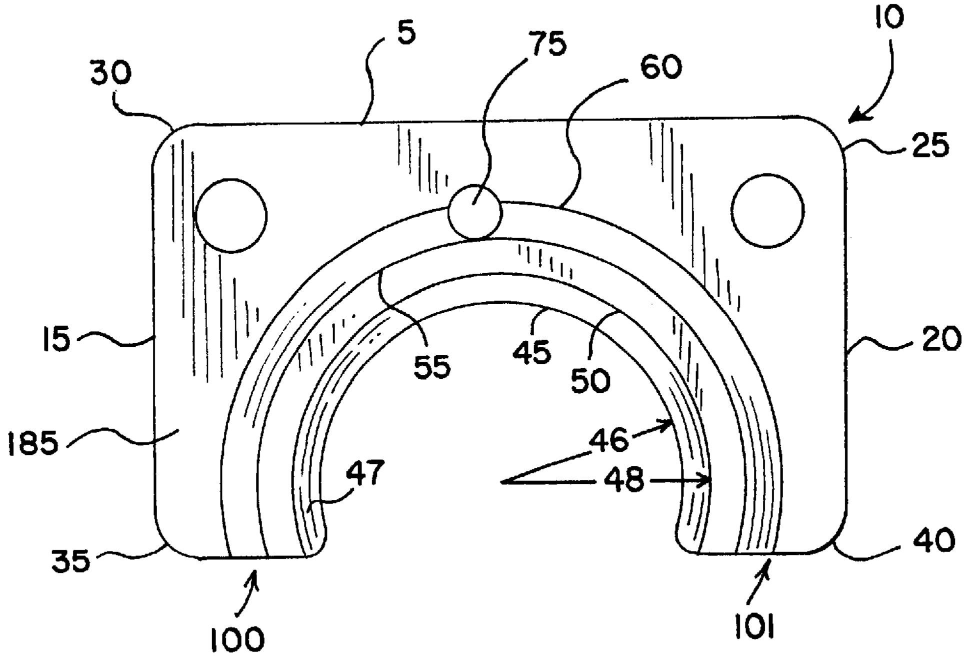
FIG. 2 is a front view of the preferred embodiment of the present invention.
Figure 3:
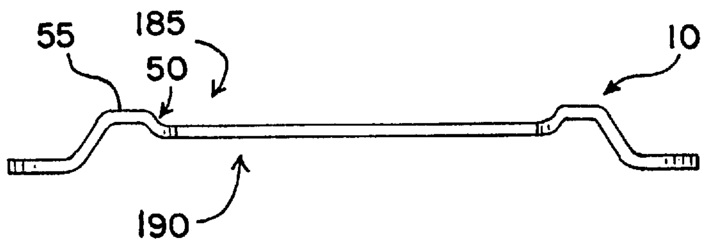
FIG. 3 is a cross-sectional view of the bottom edge of the preferred embodiment of the present invention.

FIG. 2 & 3 show a front and profile view, respectively, of the balance shaft seal retainer 10. The preferred seal clamp is generally rectangular shaped with rounded corners 25, 30, 35, & 40. The top edge 5, first side edge 15, and second side edge 20 are linear. The bottom edge 45 is semi-circular with a properly sized flange 47 to hold the balance shaft seal in place. The flange 47 is bounded by inner flange edge 45 and outer flange edge 50 and sized by inner flange radius 46 and outer flange radius 48. The width of the flange 47 preferably extends to one-half the distance between the balance shaft seal's inner radius and outer radius. The semi-circular configuration of bottom edge 45 also permits the balance shaft seal retainer 10 to be installed without having to remove the balance shaft 170 or timing or balance belt 160, since the cutout spans the balance shaft.

The front face 185 of the balance shaft seal retainer consists of a series of ridges. The rear face 190 consists of a series of indentations complementing the ridges on the front face 185. These ridges accommodate the annular indentation 180 on the oil pump housing where the balance shaft seal 12 sits. The ridge profile consists of a semi-circular shape with three distinct levels. The inner base of the ridge 50, which defines the initial rise of the ridge, is dimensioned to equal the outer flange radius 48 that holds the balance shaft seal in place. The peak of the ridge 55 accommodates and is adapted to receive the highest point of the annular indentation 180 on the bore of the oil pump housing of the engine. The outer base 60 of the ridge matches the lowest point on the descending side of the ridge where the annular indentation meets the planar level 200 of the oil pump housing. By utilizing a semi-circular ridge to accommodate and receive the annular indentation, the preferred seal clamp can be mounted, via bolts threaded through apertures 30 & 70, flush against the oil pump housing 175 without the need for spacers. The bottom edge profile 45, 50, 55 & 60 fits around the annular indentation 180 forming the seat for the balance shaft seal. Further, the series of ridges act to strengthen the legs 100 & 101 of the balance shaft seal retainer 10, making the legs 100 & 101 more resistant to deformation and failure than the prior art planar design. Finally, timing aperture 75 permits the timing belt notch 195 to be visible after installation of the balance shaft seal retainer 10. The timing belt notch is typically used to tune engine timing.

The balance shaft seal retainer described herein prevents the balance shaft seal from being pushed out of its oil pump housing seat. It is to be understood that both the foregoing general description and the following detailed description are exemplary and explanatory and are intended to provide further explanation of the invention as claimed. Numerous modifications and variations are possible. For example, the general shape of the retainer, the shape of the bottom edge cutout, the profile, and the position of apertures may vary depending on the surface of the oil pump housing and the mounting position of the retainer. Therefore, the foregoing detailed description is intended to be illustrative rather than limiting. It is the following claims, including all equivalents, which are intended to define the scope of this invention.

I claim:

1. A balance shaft seal clamp for maintaining the position of a balance shaft seal about a balance shaft mounted in a bore of an engine, the balance shaft seal clamp having generally rectangular configuration with a semi-circular cutout, a semi-circular flange, and a non-planar profile, whereby the clamp can be mounted flush with an engine housing while the semi-circular flange holds the balance shaft seal in place, and wherein the clamp has a plurality of apertures and at least one of the plurality of apertures exposes a timing mark on the engine.

2. Within an engine timing belt assembly wherein a shaft is mounted through a bore into the oil pump housing, the bore sealed within the oil pump housing by a balance shaft seal, a balance shaft seal clamp apparatus comprising:

- a generally rectangular configuration;
- a fixed-width semi-circular cutout flange with an inner flange radius and an outer flange radius encompassing a semi-circular portion of the balance shaft seal;
- an aperature for mounting the clamp on the engine;
- a semi-circular ridge with an inner base radius equal to the outer flange radius of the cutout flange, a peak radius which is greater than the inner base radius, and an outer base radius which is greater than the peak radius, the ridge accommodating an annular indentation surrounding a balance shaft seal on an oil pump housing; and
- an aperture for viewing a timing notch on the oil pump housing.

3. A balance shaft seal clamp for maintaining the position of a balance shaft seal about a balance shaft mounted in an annular indentation in a bore of an engine, the balance shaft seal clamp comprising:

- a non-planar profile;
- a generally rectangular configuration;
- a bottom edge having a semi-circular cutout spanning a balance shaft of an engine;
- a semi-circular ridge adapted for receiving an annular indentation in a bore of an engine; and
- a semi-circular flange along the semi-circular cutout for securing a balance shaft seal within an annular indentation in the bore of an engine.

* * * * *